United States Patent Office 3,260,701
Patented July 12, 1966

3,260,701
PREPARATION OF AROMATIC POLYETHERS WITH LEAD DIOXIDE CATALYST
Edward J. McNelis, Wallingford, Pa., assignor to Sun Oil Company, Philadelphia, Pa., a corporation of New Jersey
No Drawing. Filed Dec. 12, 1962, Ser. No. 244,019
12 Claims. (Cl. 260—47)

This invention relates to aromatic polyethers and more particularly to a method for preparing such ethers by polymerizing phenol or a non-halogenated derivative thereof in the presence of lead dioxide in accordance with the following reaction:

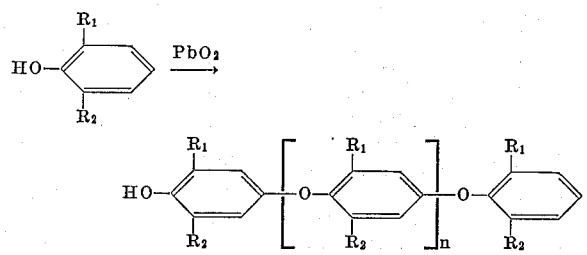

wherein $R_1$ and $R_2$ are selected from the group consisting of hydrogen, alkoxy radicals having from 1 to 3 carbon atoms and alkyl radicals having from 1 to 3 carbon atoms and $n$ is an integer greater than 0 and can range up to about 20,000.

Aromatic polyethers of high molecular weight are of value as thermoplastic resins which may be extruded or molded at elevated temperatures and pressures to form solid rigid materials which are insoluble in most solvents. The lower molecular weight materials find particular utility as insecticides, fuel and lubricant additives and plasticizers. Heretofore these types of materials have been prepared by a number of methods such as the well known Ullmann synthesis as described and referred to in "Synthetic Organic Chemistry" by Wagner and Zook, John Wiley and Sons (1953), page 227 and references cited therein. Briefly, that method involves treating an alkali metal salt of a phenol with an aryl halide or polyhalide in the presence of a catalyst such as copper at temperatures ranging between 200° C. and 300° C. for 0.5 hour to 10 hours, pouring the hot mixture into a solvent such as toluene or xylene, filtering the insoluble alkali metal halide, washing with aqueous caustic to remove excess phenol, and removing the solvent by distillation or evaporation to isolate the polyphenyl ether or derivatives thereof.

A method has now been found whereby aromatic polyethers can be prepared directly from phenol or a non-halogenated derivative thereof utilizing lead dioxide.

Briefly, the instant invention comprises contacting phenol or a non-halogenated derivative thereof with lead dioxide at a temperature in the range of 20° C. to 250° C. for a period of time ranging between 10 seconds and 10 hours and recovering an aromatic polyether product.

Sutable starting materials which can be used to prepare the aromatic polyethers in accordance with the instant invention have the general formula

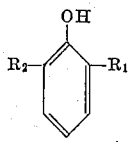

wherein $R_1$ and $R_2$ are selected from the group consisting of hydrogen, alkoxy radicals having from 1 to 3 carbon atoms and alkyl radicals having from 1 to 3 carbon atoms. Examples of specific compounds include phenol, 2,6-xylenol, 2,6- dimethoxyphenol, 2,6-diethoxyphenol, 2,6-diisopropoxyphenol, 2-methyl - 6 - ethyl phenol, 2-methoxy - 6 - ethoxyphenol and 2-methoxy-6-propoxyphenol.

As stated above, in accordance with this invention, phenol or non-halogenated derivative thereof is contacted with lead dioxide to produce aromatic polyethers. The phenol or non-halogenated derivatives thereof can be contacted with the lead dioxide either in the presence or absence of a solvent material and in the presence or absence of air.

It is preferred that prior to contacting the phenol or non-halogenated derivative thereof with lead dioxide, it be dissolved in a suitable solvent and the lead dioxide be added to the resulting solution. Examples of suitable solvents include chloroform, benzene, toluene, nitrobenzene, dimethylformamide, ethyl ether and petroleum ether. Chloroform and benzene are the preferred solvents.

If the phenol or non-halogenated derivative thereof is contacted with lead dioxide in the absence of air, there are produced relatively low molecular weight polymeric products ranging from liquids to solids. The molecular weight of these materials generally will range between about 1000 and 10,000.

If, however, higher molecular weight materials are desired, the phenol or non-halogenated derivative thereof is contacted with lead dioxide in the presence of air or oxygen. The polymeric products so produced have a molecular weight of the order of magnitude of 20,000.

The temperature at which either the phenol or non-halogenated derivative thereof—lead dioxide mixture of solution of phenol or non-halogenated derivative thereof—lead dioxide mixture is contacted can vary over a wide range. It has been found that substantial amounts of aromatic polyether products are produced at a temperature as low as 20° C. If the phenol or non-halogenated derivative is not contained in a solvent, the maximum temperature to which the reaction mass can be heated is governed only by the decomposition temperature of the monomer. If the phenol or non-halogenated derivative thereof is dissolved in a solvent prior to the addition thereto of the lead dioxide, the maximum temperature to which the reaction mass can be heated is governed by the boiling point of the solvent at the pressure used. While temperatures ranging between about 20° C. to a high as 250° C. can be used in this invention, it is preferred that a temperature ranging between about 60° C. and 250° C. be used.

The time that the reaction mixture is contacted can vary between 10 seconds and 10 hours. It is preferred that the contacting time range between about 0.5 hour and 2 hours.

The molar ratio of lead dioxide to phenol or non-halogenated derivative thereof can also vary over wide limits. It has been found that if trace amounts of lead dioxide are present in the reaction mass, there is produced some polymeric product. It is preferred, however, that in order to optimize the amount of polymer produced, the molar ratio of lead dioxide to phenol or non-halogenated derivative be in the range of from about 1:100 to 100:1 with a molar ratio ranging between about 3:1 and 10:1 being most preferred.

To recover the desired product, the reaction mass is first separated, such as by filtration, and the filtrate is washed with a dilute solution of aqueous sodium hydroxide. The polymer can be obtained from the solvent by evaporation or it can be precipitated by pouring the solution into excess methanol.

The following examples serve to further illustrate the instant invention:

Example I

To 4.1 grams of 2,6-xylenol dissolved in 50 ml. of chloroform there were added 23.9 grams of reagent grade lead dioxide. The resulting mixture was heated at reflux temperature (about 61° C.) in an atmosphere of nitrogen for one hour. At the end of the reaction time the mixture was separated by filtration and the chloroform filtrate was washed with 100 ml. of 5% aqueous sodium hydroxide. The chloroform layer was separated from the aqueous layer and poured into excess methanol. The resulting precipitate was separated by filtration and dried to remove excess solvent. This material had a melting range of 185° C. to 189° C. It was identified as a polymeric xylenol by infrared spectrum and elemental analysis. It had a carbon content of 79.94%, a hydrogen content of 6.59% and an oxygen content of 13.39%, as compared with calculated values for $(C_8H_8O)_n$ of 80.00%, 6.67% and 13.33% respectively. The molecular weight of this material as determined by ebullioscopic methods was 3009.

Example II

To 5.14 grams of 2,6-dimethoxyphenol dissolved in 150 ml. of benzene there were added 23.9 grams of reagent grade lead dioxide. The resulting mixture was heated at reflux temperature (about 80° C.) for two hours with an air stream bubbling through the mixture. At the end of the reaction time the mixture was separated by filtration and the benzene solution was washed with 100 ml. of 5% aqueous sodium hydroxide. The benzene layer was separated from the aqueous layer and evaporated to dryness. There were recovered 1.994 g. of a material having an infrared spectrum corresponding to that of an aromatic polyether. This material was identified by elemental analysis which showed a carbon content of 62.97%, a hydrogen content of 5.76% and an oxygen content of 31.53%, as compared with theoretical values for $(C_8H_8O_3)_n$ of 63.00%, 5.27% and 31.60% respectively.

Example III

To 4.1 grams of 2,6-xylenol dissolved in 50 ml. of benzene there were added 23.9 grams of reagent grade lead dioxide. The resulting mixture was heated at reflux temperature (about 80° C.) for two hours with an air stream bubbling through the mixture. At the end of the reaction time the mixture was separated by filtration and the benzene filtrate was evaporated to dryness. The residue was dissolved in a minimum amount of chloroform and washed with 100 ml. of 5% aqueous sodium hydroxide. The chloroform layer was separated from the aqueous layer and poured into excess methanol. The resulting precipitate was separated by filtration and dried to remove excess solvent. There were recovered 2.29 g. of a solid material which had an intrinsic viscosity at 30° C. of 0.42. The molecular weight of this polymer based on intrinsic viscosity was about 20,000.

Substantially similar results are obtained when other of the solvents named above are substituted for chloroform and benzene and when other monomers such as phenol, 2,6-diethyl phenol, 2,6-diethoxyphenol, 2-methyl-6-ethyl phenol and 2,6-diisopropyl phenol are substituted in the foregoing examples.

I claim:

1. Method for preparing aromatic polyethers which comprises contacting a material having the general formula

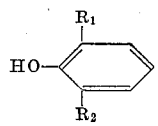

wherein $R_1$ and $R_2$ are selected from the group consisting of hydrogen, alkoxy radicals having from 1 to 3 carbon atoms and alkyl radicals having from 1 to 3 carbon atoms with lead dioxide at a temperature in the range of from 20° C. to 250° C. for a period of time ranging between 10 seconds and 10 hours and thereafter recovering said aromatic polyether product.

2. Method in accordance with claim 1 wherein the temperature is in the range of from 60° C. to 250° C. for a period of time of from 0.5 hour to 2 hours.

3. Method in accordance with claim 2 wherein the contacting is conducted in the presence of air.

4. Method in accordance with claim 1 wherein the contacting is conducted in the presence of air.

5. Method for preparing aromatic polyethers which comprises dissolving a material having the general formula

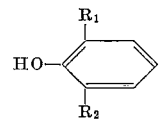

wherein $R_1$ and $R_2$ are selected from the group consisting of hydrogen, alkoxy radicals having from 1 to 3 carbon atoms and alkyl radicals having from 1 to 3 carbon atoms, in a solvent and contacting the resulting solution with lead dioxide at a temperature in the range of from 20° C. to 250° C. for a period of time ranging between 10 seconds and 10 hours and thereafter recovering said aromatic polyether product.

6. Method in accordance with claim 5 wherein said solvent is selected from the group consisting of chloroform, benzene, toluene, nitrobenzene and dimethylformamide.

7. Method in accordance with claim 6 wherein the temperature is in the range of from 60° C. to 250° C. for a period of time of from 0.5 hour to 2 hours.

8. Method in accordance with claim 5 wherein the temperature is in the range of from 60° C. to 250° C. for a period of time of from 0.5 hour to 2 hours.

9. Method for preparing aromatic polyethers having the general formula

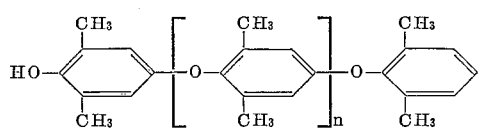

wherein $n$ is an integer greater than 0, which comprises dissolving 2,6-xylenol in a solvent and contacting the resulting solution with from 0.01 to 100.0 moles of lead dioxide per mole of 2,6-xylenol at a temperature in the range of from 20° C. to 250° C. for a period of time ranging between 10 seconds and 10 hours and thereafter recovering said aromatic polyether.

10. Method according to claim 9 wherein the molar ratio of lead dioxide to 2,6-xylenol ranges between 3.0:1.0 and 10.0:1.0.

11. Method for preparing aromatic polyethers having the general formula wherein $n$ is an integer greater than 0, which comprises dissolving 2,6-dimethoxyphenol in a solvent and contacting the resulting solution with from 0.01 to 100.0 moles of lead dioxide per mole of 2,6-dimethoxyphenol at a temperature in the range of from 20° C. to 250° C. for a period of time ranging between 10 seconds and 10 hours and thereafter recovering said aromatic polyether.

12. Method in accordance with claim 11 wherein the molar ratio of lead dioxide to 2,6-dimethoxyphenol ranges between 3.0:1.0 and 10.0:1.0.

References Cited by the Examiner

UNITED STATES PATENTS 3,134,753  5/1964  Kwiatek _____ 260—47

OTHER REFERENCES

Blanchard: J. Polymer Science, Vol. 58, pages 469–490, April 1962, pp. 476–480 relied on.

Dewar: J. Chem. Society (London), 1958, pp. 917–922.

Price et al.: Journal of Polymer Science, Vol. 61, pages 135–141, September 1962.

Staffin et al.: J.A.C.S., Vol. 82, pages 3632–3634, July 1960.

S.C.I., Monograph No. 13 (1961), pages 238–241.

WILLIAM H. SHORT, *Primary Examiner.*

J. C. MARTIN, *Assistant Examiner.*